United States Patent
Bessel et al.

(10) Patent No.: US 10,599,131 B2
(45) Date of Patent: Mar. 24, 2020

(54) SYSTEM AND METHOD FOR AN AUTOMATED KIOSK WHICH RESPONDS TO NATURAL DISASTERS

(71) Applicant: Walmart Apollo, LLC, Bentonville, AR (US)

(72) Inventors: Kurt W. Bessel, Mexico, NY (US); David G. Tovey, Rogers, AR (US); Boyd D. Bryant, Bella Vista, AR (US); Robert Armstrong, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/389,533

(22) Filed: Apr. 19, 2019

(65) Prior Publication Data
US 2019/0324426 A1    Oct. 24, 2019

Related U.S. Application Data

(60) Provisional application No. 62/661,126, filed on Apr. 23, 2018.

(51) Int. Cl.
*G07F 11/46* (2006.01)
*G05B 19/416* (2006.01)
(Continued)

(52) U.S. Cl.
CPC ............ *G05B 19/416* (2013.01); *G01W 1/10* (2013.01); *G06F 16/9537* (2019.01);
(Continued)

(58) Field of Classification Search
CPC ................. G07F 11/46; G07F 11/60
(Continued)

(56) References Cited

U.S. PATENT DOCUMENTS 3,690,430 A * 9/1972 Moreland ................. G07F 5/08
                                                        194/225
8,073,753 B2   12/2011 Cunniff et al.
(Continued)

FOREIGN PATENT DOCUMENTS

WO    2016166519 A1    10/2016
WO    2017029557 A2    2/2017

OTHER PUBLICATIONS

International Search Report and Written Opinion dated Jul. 16, 2019, in corresponding International Application No. PCT/US2019/028357 (13 pages).
(Continued)

*Primary Examiner* — Timothy R Waggoner
(74) *Attorney, Agent, or Firm* — Venable LLP; Jeffri A. Kaminski (57) ABSTRACT

Systems, methods, and computer-readable storage media for an automated kiosk which responds to natural disasters. Such a system can: receive, at a processor in an automated kiosk, an electronic weather report for weather associated with a geographic location of the automated kiosk; receive, from an exterior sensor mounted on the automated kiosk, exterior sensor data; and receive, from an interior sensor mounted inside the automated kiosk, interior sensor data. The system can then identify, via the processor and based on at least one of the electronic weather report, the exterior sensor data, and the interior sensor data, a likelihood of a natural disaster affecting the automated kiosk. The system can initiate actions to protect the kiosk and/or the products stored in the kiosk from the natural disaster, based on the likelihood and the type of threat encountered.

15 Claims, 6 Drawing Sheets

(51) Int. Cl.
  *G06F 16/9537* (2019.01)
  *G01W 1/10* (2006.01)
  *G06Q 10/08* (2012.01)
  *G07F 9/02* (2006.01)

(52) U.S. Cl.
  CPC ......... *G06Q 10/0832* (2013.01); *G07F 9/026* (2013.01); *G07F 11/46* (2013.01); *G01W 2203/00* (2013.01); *G05B 2219/31274* (2013.01)

(58) Field of Classification Search
  USPC .................................................. 700/231–244
  See application file for complete search history.

(56) References Cited

U.S. PATENT DOCUMENTS

| | | | |
|---|---|---|---|
| 8,176,931 B1* | 5/2012 | Cajiga | B60S 5/02 137/234.6 |
| 8,605,414 B2 | 12/2013 | Moore et al. | |
| 9,038,831 B2 | 5/2015 | Stewart | |
| 9,228,357 B1 | 1/2016 | Varela et al. | |
| 9,389,967 B2 | 7/2016 | Dent | |
| 9,483,933 B1 | 11/2016 | Anderson et al. | |
| 2005/0023286 A1* | 2/2005 | Pinney | G06F 19/3462 221/123 |
| 2005/0126794 A1 | 6/2005 | Palmer et al. | |
| 2009/0076650 A1* | 3/2009 | Faes | G07F 11/165 700/232 |
| 2014/0052463 A1* | 2/2014 | Cashman | G06Q 20/18 705/2 |
| 2016/0371946 A1 | 12/2016 | Pantus | |
| 2017/0004472 A1 | 1/2017 | Tkachenko et al. | |
| 2018/0315271 A1* | 11/2018 | Gharabegian | G07F 9/10 |
| 2019/0031441 A1* | 1/2019 | Jin | G07F 11/165 |

OTHER PUBLICATIONS

Asecos, "Earthquake-proof cabinets for the storage of flammable liquids", pp. 1-8.
Ginko Systems, "Outdoor/weather resistant Positive ID security Kiosk", Model G5500 Ginko, pp. 1.
FireKing Security Group, "Fireproof File Cabinets", pp. 1-3.
Total Flood Solutions, "Cabinets & Kiosks", pp. 1-3.

* cited by examiner

SYSTEM AND METHOD FOR AN AUTOMATED KIOSK WHICH RESPONDS TO NATURAL DISASTERS

PRIORITY

This application claims priority to U.S. Provisional Patent Application No. 62/661,126, filed Apr. 23, 2018, the contents of which are incorporated herein in their entirety.

BACKGROUND

1. Technical Field

The present disclosure relates to automated kiosks, and more specifically to automated kiosks which react to natural disasters.

2. Introduction

Automated kiosks can be used by customers to order products and/or pick up their online orders. While kiosks exist for small items, such as soda or candy machines, larger kiosks are being implemented for larger items, such that customers can order products online, then pick them up at the kiosk. Alternatively, in some cases, the customer can order the item directly at the kiosk, and the kiosk can immediately deliver the product to the customer. However, when natural disasters arise, these automated kiosks (both large and small) may provide little protection to the products and goods being stored within the kiosk.

SUMMARY

An exemplary method configured according to this disclosure can include: receiving, at a processor in an automated kiosk, an electronic weather report for weather associated with a geographic location of the automated kiosk; receiving, from an exterior sensor mounted on the automated kiosk, exterior sensor data; receiving, from an interior sensor mounted inside the automated kiosk, interior sensor data; identifying, via the processor and based on at least one of the electronic weather report, the exterior sensor data, and the interior sensor data, a likelihood of a natural disaster affecting the automated kiosk; initiating, via the processor, movement of goods within the automated kiosk from a first location within the automated kiosk to a second location within the automated kiosk, the movement of goods being based on a type of the natural disaster and the likelihood of the natural disaster affecting the automated kiosks; and initiating, via the processor, an external protection action which modifies the automated kiosk based on the type of the natural disaster, the external protection action being based on the type of the natural disaster and the likelihood of the natural disaster affecting the automated kiosks.

An exemplary automated kiosk, configured according to this disclosure, can include: at least one external sensor; at least one internal sensor; an internal conveyor system which moves goods between a plurality of storage locations and an exit location; a processor; and a computer-readable storage medium having instructions stored which, when executed by the processor, cause the processor to perform operations comprising: receiving an electronic weather report for weather associated with a geographic location of the automated kiosk; receiving exterior sensor data from the at least one exterior sensor; receiving interior sensor data from the at least one interior sensor; identifying, via the processor and based on at least one of the electronic weather report, the exterior sensor data, and the interior sensor data, a likelihood of a natural disaster affecting the automated kiosk; and initiating, via the processor, movement of goods within the automated kiosk from a first location within the automated kiosk to a second location within the automated kiosk, the movement of goods being based on a type of the natural disaster and the likelihood of the natural disaster affecting the automated kiosks.

An exemplary non-transitory computer-readable storage device configured according to this disclosure can have instructions stored which, when executed by a computing device, cause the computing device to perform operations including: receiving, at the computing device in an automated kiosk, an electronic weather report for weather associated with a geographic location of the automated kiosk; receiving, from an exterior sensor mounted on the automated kiosk, exterior sensor data; receiving, from an interior sensor mounted inside the automated kiosk, interior sensor data; identifying, via the computing device and based on at least one of the electronic weather report, the exterior sensor data, and the interior sensor data, a likelihood of a natural disaster affecting the automated kiosk; and initiating, via the computing device, an external protection action which modifies the automated kiosk based on a type of the natural disaster, the external protection action being based on the type of the natural disaster and the likelihood of the natural disaster affecting the automated kiosks.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

Methods, systems, and non-transitory computer-readable storage devices implemented based on this disclosure can result in kiosks adapting, modifying, or otherwise protecting themselves from natural disasters. The concepts and principles disclosed herein can be applied to kiosks of various sizes and types, according to the specific circumstances and needs of a particular kiosk. For example, the principles disclosed herein can be applied to "small" automated kiosks, such as soda and candy machines, or can be applied to larger automated kiosks capable of delivering larger products. The automations of kiosks configured as disclosed herein may be controlled by controlling electronics which may be contained within the automated kiosk. Alternatively, the controlling electronics may be located remotely from the automated kiosk, and the automated kiosk itself can contain additional electronics for (1) communicating with the controlling electronics and (2) relaying messages/instructions received to components within the kiosk.

"Natural disasters," as used herein, refers to an adverse event resulting from a natural process, such as a flood, high wind, fire, earthquake, etc. These disasters can also include disasters which are, at least in part, caused by non-natural circumstances, such as flooding caused by a broken pipe, fires caused by humans, shaking due to heavy machinery, etc.

The automated kiosk can have interior storage locations, such as shelves, compartments, racks, etc., where the products contained within the automated kiosk are stored until a customer purchases or retrieves the products. The automated kiosk can also have a conveyor system for moving the products from their storage locations to the delivery door of the automated kiosk. Non-limiting, exemplary ways in which this conveyor system can be driven can include belt driven conveyors, chain driven conveyors, beltless magnetic conveyors, bucket conveyors, drag/tow conveyors, overhead conveyors, pneumatic/vacuum conveyors, powered roller conveyors, screw conveyors, vertical conveyors, walking beam conveyors, vibrating conveyors, wheel conveyors, or any combination thereof. In some configurations, the conveyor system can also be used to move products between locations within the automated kiosk in response to environmental conditions detected.

The automated kiosk can have interior sensors and/or exterior sensors which can be used to detect environmental conditions, and then used to identify the presence of natural disasters. For example, the sensors can detect heat, tilt of the kiosk, shaking, moisture, air pressure/wind, and/or other environmental conditions. The sensors then transmit the environmental data detected to the automated kiosk "brain"/processor/controlling electronics (or to the communications equipment for relay to the controlling electronics).

In order to make calculations and perform analyses, the processor can have access to information about the products stored within the kiosk. Specifically, the processor can have access to information regarding the weight and size (volume) of the individual products, such that weight distribution calculations can be made as part of the analysis of where and when to move products. The processor can likewise have access to information regarding the storage spaces within the kiosk, such as if the respective spaces are currently occupied, their weight capacity, their size capacity, electrical requirements to move products to/from the space based on size/weight, etc. Such information can be stored in a non-transitory memory device which is in electrical communication with the processor. As products are loaded into the kiosk for storage, the data associated with those products can be transferred into the non-transitory memory.

The processor can also communicate with exterior resources which may indicate various threats or conditions, which the processor can evaluate and determine, and direct the response. For example, the processor can receive weather reports which may indicate threat of fire, wind, flooding, etc. The processor may likewise receive communications from a control center, the communications notifying the processor of weather, disaster, information about the products stored in the kiosk, and/or other information.

The processor receives the data from the sensors and executes an algorithm on the data and, when necessary, transmits signals to motors or actuators within the kiosk to perform an action. Generally, the actions signaled by the processor initiate protections for the kiosk and/or the products stored in the kiosk, or to retract/end protections in place. Consider the following examples.

In a first example, an automated kiosk can be configured to withstand high winds by having vents which can pass wind through the kiosk, thereby preventing the kiosk from acting as a sail when the winds hit the kiosk. These vents can be retractable, such that the vents are generally closed, and only open when high winds are detected. High wind can be detected based on a wind speed sensor that detects the speed and direction of the wind or a difference in pressure for sensors on one side of the kiosk compared to sensors on another side (such as the opposite side). When that disparity exists, the processor may initiate actions within the kiosk to protect the kiosk and/or products within the kiosk from possible harm.

One exemplary action the processor can initiate is to open the retractable vents, such that air passes through. Another possible action the processor can initiate is move relocate products within the kiosk based on weight. In the case of high wind, the processor may compare the relative weights of the products contained within the kiosk, then relocate the heaviest products to a lower portion of the kiosk near the side receiving the wind, and the lightest products to a higher portion of the kiosk near the side not receiving the wind. In some circumstances, the processor may determine that it is necessary to both open the vents and move the products within the kiosk. For example, the kiosk may have a specified threshold where the vents should be opened, and a second specified threshold where the products should be rearranged. In addition, these thresholds may vary based on the gross weight of the kiosk at a given time, such that if the kiosk is filled with heavy products the threshold for when the kiosk should open the vents, or the threshold for when the kiosk should relocate the products, are different than if the kiosk were filled with light products.

In another example, the kiosk may detect that there is a fire outside the kiosk. In one scenario, temperature sensors can measure a temperature gradient between different sides of the kiosk (e.g., relatively hot on one side, relatively cool on the other), or the temperature sensors can measure that the actual temperature exceeds a threshold amount indicating a fire is present. When the analysis of the processor, based on the data produced by the sensors, identifies that there is likely a fire near the kiosk, the processor can initialize actions to protect the kiosk and/or the products contained in the kiosk.

An exemplary action which can be taken to protect the kiosk from the threat of fire is a deployment of a heat shield. This can occur by the processor sending a signal to motors or actuators which move the heat shield into place. Another exemplary action which the processor can initiate to protect the kiosk is the exterior deployment of a flame retardant, such as water, flame retardant foam or spray.

An exemplary action which the processor can initiate to protect the products stored within the kiosk is deploying flame retardant within the kiosk. Another exemplary action which the processor can initiate to protect the products stored within the kiosk is movement of products within the kiosk. For example, if the fire is detected on the left side of the kiosk, the kiosk can move products to the right side of the kiosk. The kiosk can order the movement of products based on factors such as energy required to move a specific product, cost/value of a product, heat resistance of a product, etc. For example, the processor can calculate, for each product, a score based on weights of the product's factors, where the score indicates a relative need to move the product when compared to the scores of other products.

In another example, the kiosk may detect that a flood is occurring, or identify the threat of a flood. In one scenario, the kiosk receives a warning that a potential flood is imminent, whereas in another scenario the sensors provide data to the processor, and the processor in turn determines the sensor data indicates the threat of flood. For example, interior or external kiosk sensors may detect moisture and transmit to the processor a signal which the processor determines indicates a flood. In one case, a single sensor may detect and transmit a moisture notification to the processor, which the processor may interpret as a spill or other localized wet spot. In another case, multiple sensors at different locations on the kiosks may detect and transmit moisture notifications to the processor (within a threshold period of time), with the result that the processor determines that a flood is occurring or threatening the kiosk.

When the flood, or threat of flood, is detected the processor can initiate action to protect the kiosk and/or the products stored within the kiosk. One exemplary action which the kiosk can take is to seal the kiosk, such that liquids cannot enter the kiosk. Implementation of sealing can take the form of moving components to block/seal openings, such as the delivery door. Sealing can also take the form of deploying a sealant (foam, spray, etc.) within the kiosk. Another action which the processor can initiate is raising the kiosk. For example, the kiosk can deploy stilts or other mechanisms to lift the kiosk. More specifically, the processor can engage motors to turn gears or pneumatics, which in turn lift the entire kiosk. Later, if the kiosk receives a communication, instruction, or sensor data indicating that the flood has receded, the processor can initiate the kiosk lowering back to the original position by retracting the stilts.

Another exemplary action the kiosk can take is to activate an inflatable skirt around the bottom of the kiosk. In an event of a flood it will create this area of protection around the bottom of the kiosk. There may be different levels of action that are taken based on the information gathered by the sensors and kiosk. For example, the weather report may indicate that there is going to be nine inches of rain in twenty-four hours, or at least ninety-nine percent chance that is happening. The processor may determine this is a level one alert. No action is taken at that time, it's just an alert. Level two may be the sensors at the kiosk indicate it's raining hard and sensors or visual indicate that water is approaching the kiosk. The kiosk may move products to the upper levels of the kiosk at this time. However, the skirt may not be activated as customers may not be able to take the product out when the skirt's activated. Additional actions may be to de-link from a power supply if an electrical storm is detected or to raise the kiosk as noted above.

Earthquakes are a natural disaster which can be difficult to predict. However, the average earthquake is generally between 10 to 30 seconds, and there are often aftershocks. When the shaking of an earthquake begins, the processor can initiate actions to protect the kiosk and/or the products. An exemplary action which can protect the entire kiosk during an earthquake can include anchoring the kiosk to a wall, floor, or ceiling. This anchoring can include initiating hooks, tightening existing anchors, etc. An exemplary action which can protect the products stored within the kiosk is deploying a foam or other cushioning material near the products, such that as the products move during the earthquake they are slowed by the foam. As with other disasters, deploying the foam can be based on the attributes of specific products. For example, if a particular product is more sensitive to shaking than another, or a more expensive product than another, the processor can prioritize deployment of foam near those products.

The different sensors and protective measures may be modular in nature so that they can be deployed when needed. For example, kiosk that are to be deployed in areas prone to flooding, hurricanes, etc. may be equipped with the flood module.

It is noted that the various responses and actions described herein which are initiated by the processor are not confined to the particular disaster in which they are described. For example, while sealing of the kiosk is described with respect to flooding, there may be circumstances where sealing is identified as a course of action to other types of natural disaster (such as smoke or chemical detection). In other words, there may be scenarios in which responses normally associated with fire, high wind, earthquakes, flooding, or other natural disasters, may be useful in other circumstances, and therefore the solutions associated with any given disaster may also be applied to other disasters as needed.

Figure 1:
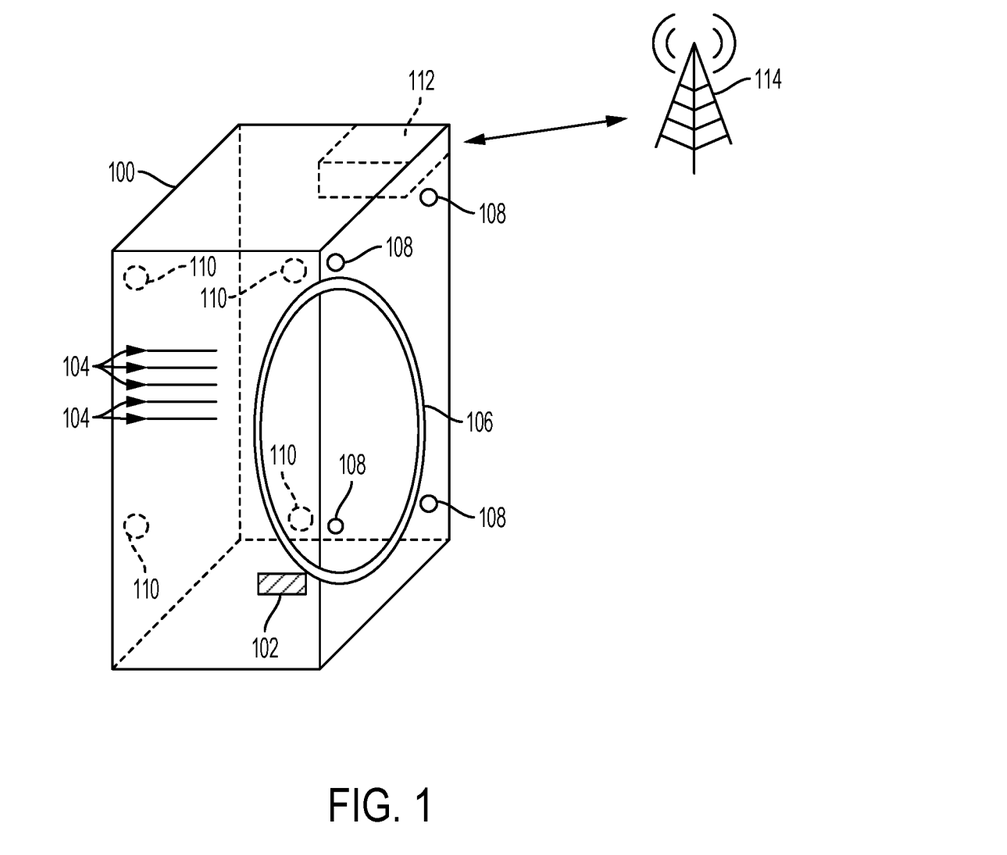
FIG. 1 illustrates an exemplary automated kiosk.

Having described the overall process by which the automated kiosk can obtain data and respond to various natural disasters, the disclosure now turns to the specific examples and configurations illustrated in the figures. FIG. 1 illustrates an exemplary automated kiosk 100. The automated kiosk 100 can have a delivery door 102, through which customers can retrieve the respective products. The automated kiosk 100 can have interior shelving 104 or storage locations, exterior sensors 108, and interior sensors 110. The automated kiosk 100 can also have an interior conveyor system 106, which can move products from shelves 104 to the delivery door 102, or between shelving/product storage locations 104. The automated kiosk can have a portion 112 dedicated to controlling electronics, such as one or more processors, non-transitory computer-readable storage mediums which can store code to be executed by the processor and/or information about the products stored within the kiosk, and/or communication equipment. The communication equipment can be used to communicate with remote resources 114, which can be an access point for a network, a remotely located control center, or other remote resources.

Figure 2:
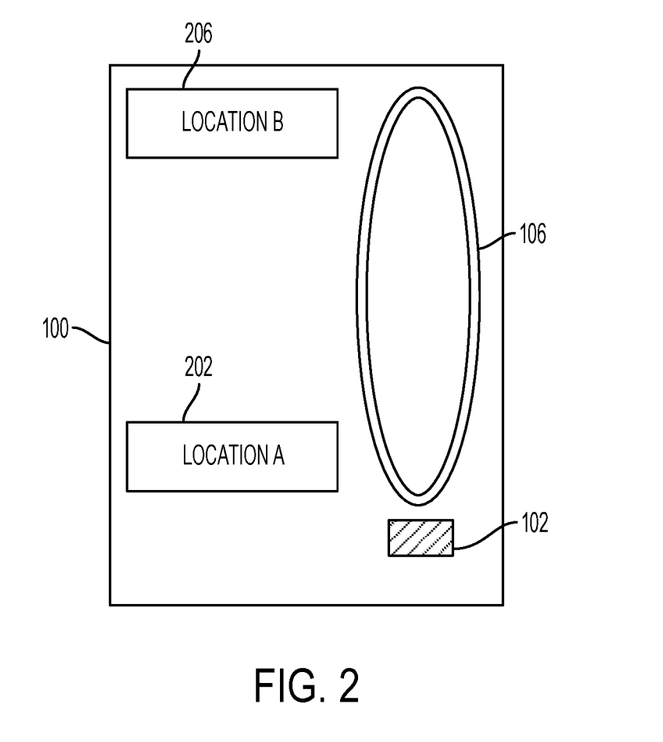
FIG. 2 illustrates multiple storage positions within an exemplary automated kiosk.

FIG. 2 illustrates multiple storage positions 202, 206 within an exemplary automated kiosk 100. When a disaster, or potential disaster, is identified, the processor can cause the conveyor system 106 to move products from location A 202 to location B 206, or vice versa. For example, if the processor determines that a fire is on the side of the kiosk 100 nearest to location A 202, the processor can cause the conveyor system 106 to move the product stored at location A 202 to location B 206. Likewise, if location B 206 is higher than location A 202, if the processor determines that a flood is occurring, the processor can initiate the conveyor system 106 to move the product stored at location A 202 to location B 206. Once the kiosk has moved the products to safer locations, it may determine that it is acceptable to allow the lower portion of the kiosk to flood as the products are safe, so no other actions are required.

Figure 3:
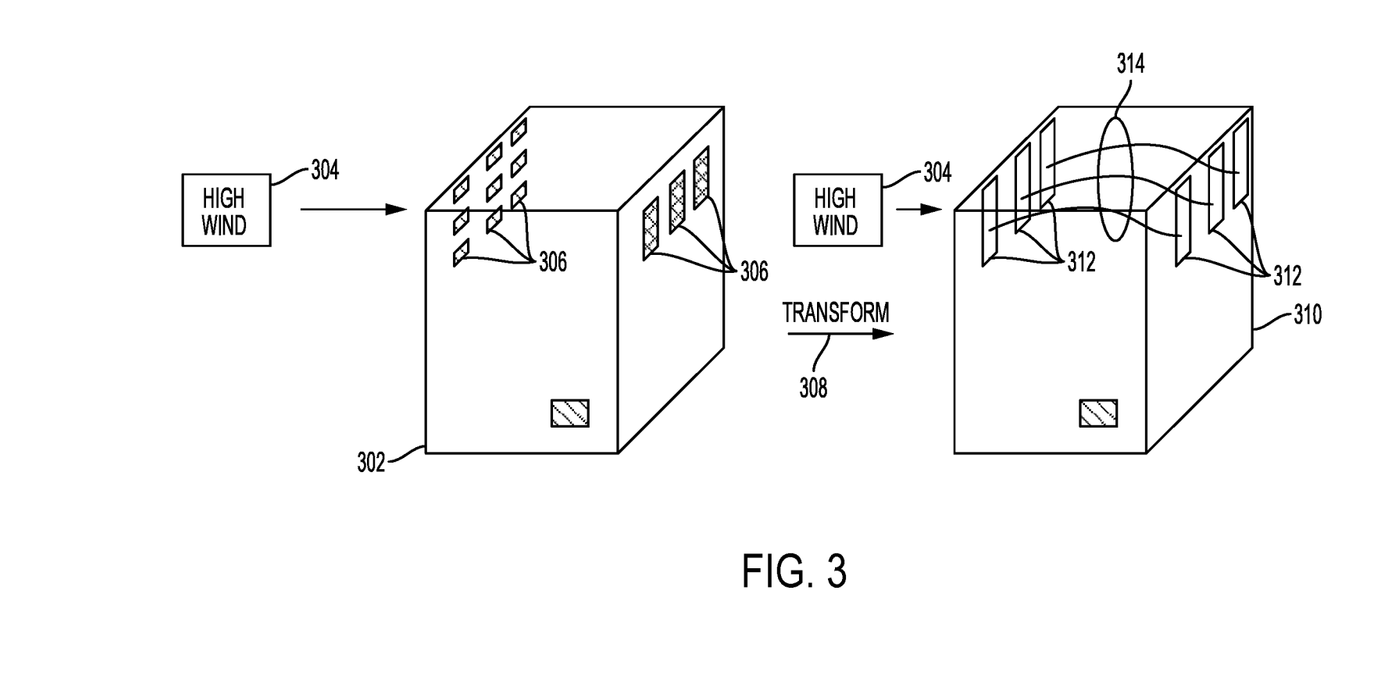
FIG. 3 illustrates an automated kiosk responding to high wind.

FIG. 3 illustrates an automated kiosk 302 responding to high wind 304. In this example, the kiosk 302 has built-in vents 306 which can be opened or closed, based on commands received from the processor. As the high wind 304 is detected, the vents 306 are closed, and the processor issues a command to open the vents. This transformation 308 occurs, allowing the high wind 304 to pass through 314 the open vents 312 of the transformed kiosk 310. The vents may be ducted to each other, and segregated from the rest of the kiosk so outside materials, such as water or dirt, does not enter the kiosk via the vents. The vents may be arranged around the kiosk, or on one or more or all sides of the kiosk, and at different heights.

Figure 4:
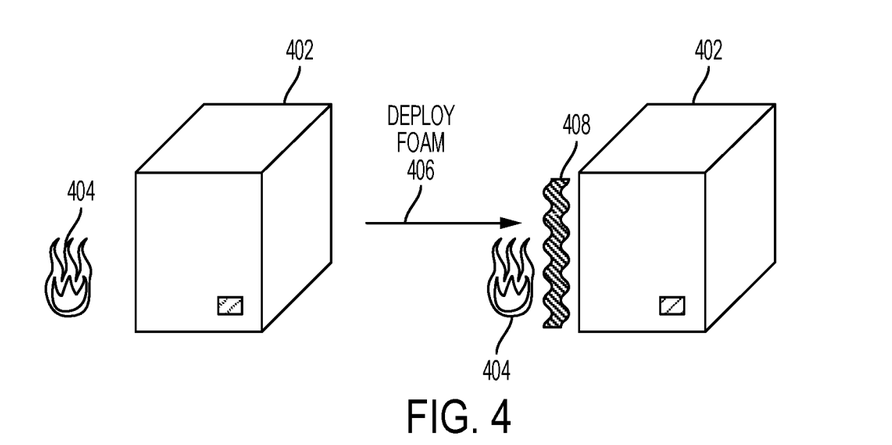
FIG. 4 illustrates an automated kiosk responding to a fire.

FIG. 4 illustrates an automated kiosk 402 responding to a fire 404. In this example, the automated kiosk 402 deploys 406 fire retardant foam 408 between the fire 404 and the automated kiosk 402, protecting the automated kiosk 402. In other scenarios, the fire retardant foam 408, a heat shield, or other fire protection mechanisms may be deployed inside the kiosk 402, surrounding the kiosk, or between the fire 404 and the kiosk 402. The kiosk may include heat sensors and smoke detectors to detected the threat of a fire or fire. The processor may determine that the temperature on one side of the kiosk is higher than a predetermined threshold that an opposite or other side of the kiosk. Based on this information, the processor determines that any flammable materials of the hot side of the kiosk need to be moved to the cooler side, and initiate this action.

Figure 5:
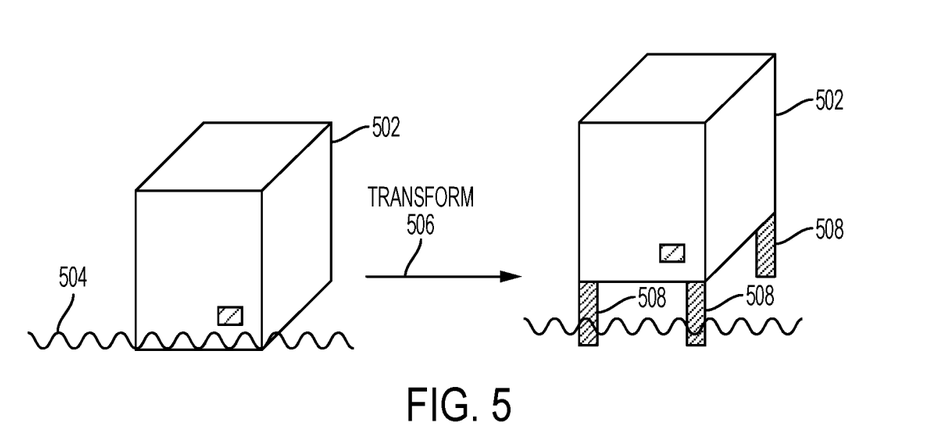
FIG. 5 illustrates an automated kiosk responding to a flood.

FIG. 5 illustrates an automated kiosk 502 responding to a flood 504. Because of the flood 504, the processor initiates a transformation 506 of the kiosk 502. In this case, the transformation 506 is the deployment of stilts 508, such that the kiosk 502 is higher than it was previously. In some circumstances, raising the kiosk 502 via the stilts 508 may still result in portions of the kiosk being exposed to the flood 504, whereas in other circumstances the entirety of the kiosk 502 may be raised above the flood. In some configurations, the height to which the kiosk 502 is raised by the stilts can vary based on the height of the flood 504, such that if the flood 504 is 1 foot (0.3048 m), the stilts raise the kiosk 502 just over 1 foot (0.3048 m). If the flood 504 is 3 feet (0.9144 m), the stilts raise the kiosk 502 just over 3 feet (0.9144 m). Repeated measurements can occur to enable the processor to receive updated data about the flood's 504 height, such that if additional transformations (such as additional height, or sealing of the delivery door) need to occur, they can. In addition, the vents may be opened to allow access to the kiosk to dry out the interior if water or moisture is able to enter the kiosk.

Figure 6:
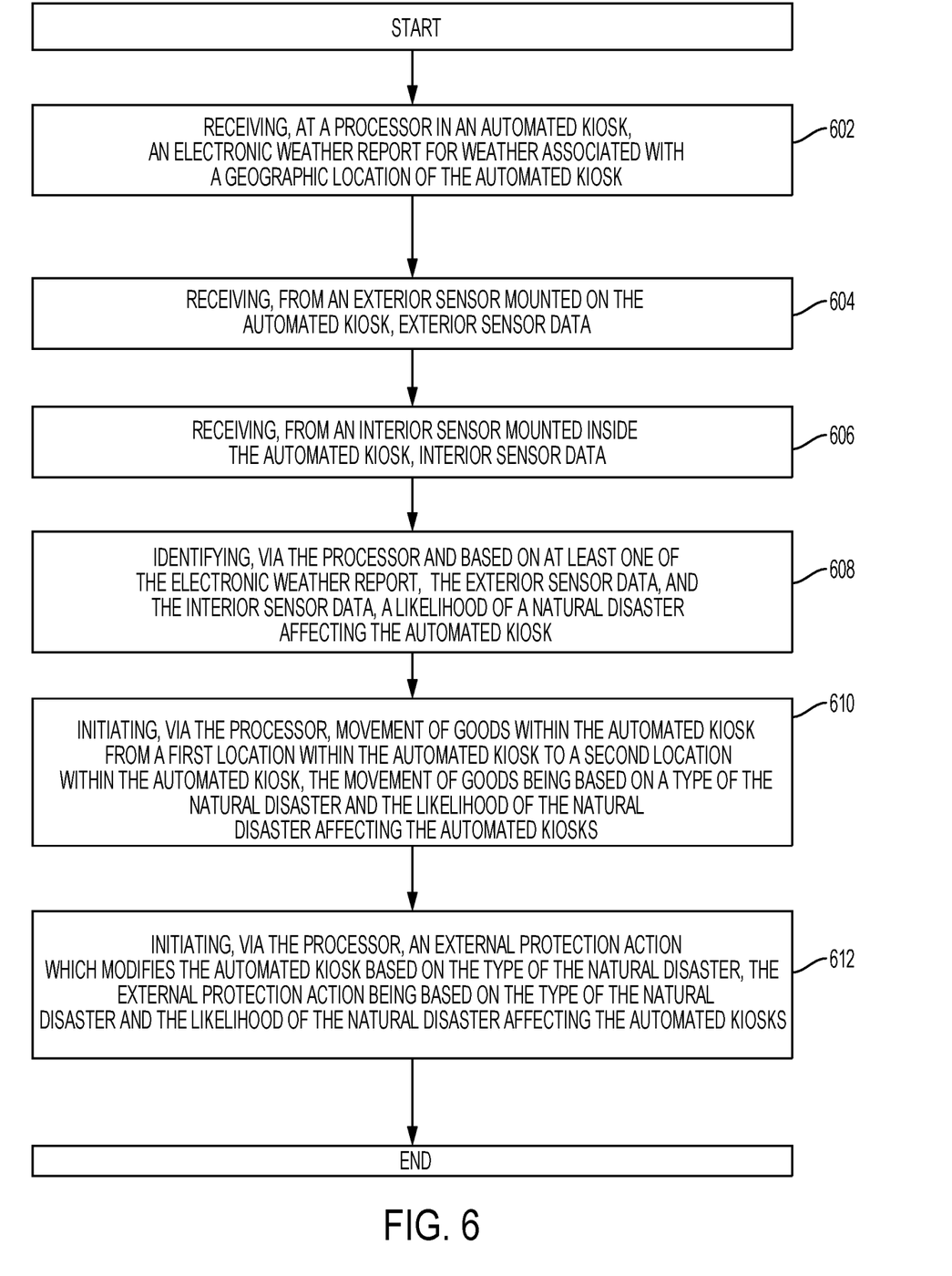
FIG. 6 illustrates an example method embodiment.

FIG. 6 illustrates an example method embodiment. A system or kiosk performing this method can receive, at a processor in an automated kiosk, an electronic weather report for weather associated with a geographic location of the automated kiosk (602). The system can likewise receive, from an exterior sensor mounted on the automated kiosk, exterior sensor data (604), and from an interior sensor mounted inside the automated kiosk, interior sensor data (606). The system can then identify, via the processor and based on at least one of the electronic weather report, the exterior sensor data, and the interior sensor data, a likelihood of a natural disaster affecting the automated kiosk (608). The system can then initiate, via the processor, movement of goods within the automated kiosk from a first location within the automated kiosk to a second location within the automated kiosk, the movement of goods being based on a type of the natural disaster and the likelihood of the natural disaster affecting the automated kiosk (610). In addition, the system can initiate, via the processor, an external protection action which modifies the automated kiosk based on the type of the natural disaster, the external protection action being based on the type of the natural disaster and the likelihood of the natural disaster affecting the automated kiosks (612).

Non-limiting examples of the type of natural disaster can include a fire, a flood, an earthquake, and high wind. The natural disaster may be, at least partially, influenced or caused by human actions or devices.

When the type of the natural disaster is a flood, the movement of goods can include moving goods from a lower level inside the automated kiosk to a higher level inside the automated kiosk via an internal conveyor system. Similarly, when the natural disaster is a flood, the external protection action can engage stilts which raise the automated kiosk, and/or seals the interior of the automated kiosk from water entry.

When the type of the natural disaster is a fire, the movement of goods can include moving goods from a heated side of the automated kiosk to a cooler side of the automated kiosk via an internal conveyor system. Exemplary external protection actions can include deploying a flame retardant and/or deploying a heat shield.

When the type of the natural disaster is high wind, the movement of goods can include moving goods from a higher level inside the automated kiosk to a lower level inside the automated kiosk via an internal conveyor system, thereby shifting the center of gravity of the kiosk to lower the risk of the kiosk being overturned by the wind. Exemplary external protection action for high winds can include opening air vents in the automated kiosk, allowing the wind to pass through the kiosk.

In some configurations, the automated kiosks performing the method of FIG. 6, or similar methods per the principles disclosed herein, can have multiple levels of reaction, such that a first action is taken when the threat is at a (relatively) low level, and distinct actions are taken when the threat is at (relatively) higher levels, where the threat level is determined by the processor based on the sensor data received. In such configurations, the system can determine the likelihood of the natural disaster affecting the automated kiosk, such that the likelihood fits into one of a plurality of levels of threats, and each level of likelihood is associated with distinct movements of goods and distinct external protection actions from those on other levels for that disaster type.

Figure 7:
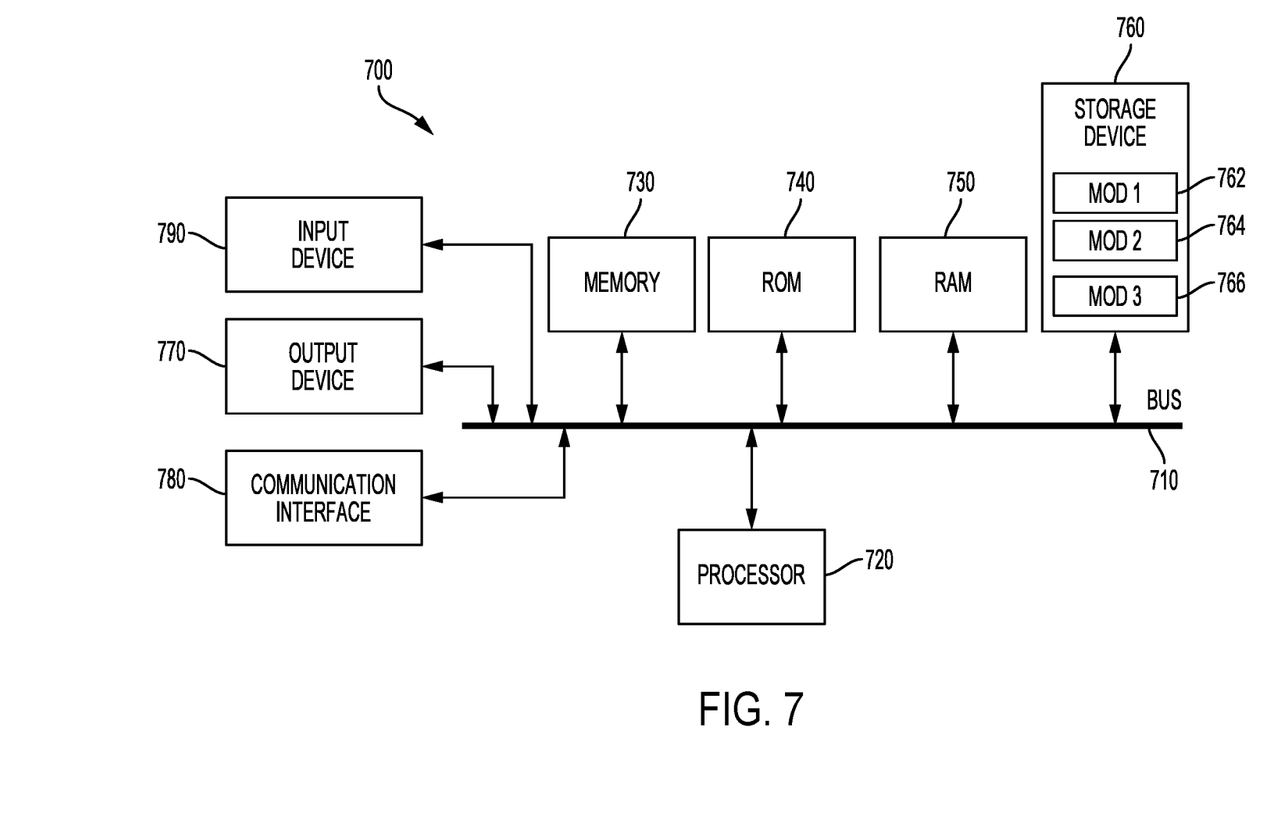
FIG. 7 illustrates an exemplary computer system.

With reference to FIG. 7, an exemplary system can include a general-purpose computing device 700, including a processing unit (CPU or processor) 720 and a system bus 710 that couples various system components including the system memory 730 such as read-only memory (ROM) 740 and random access memory (RAM) 750 to the processor 720. The system 700 can include a cache of high-speed memory connected directly with, in close proximity to, or integrated as part of the processor 720. The system 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, bus 710, display 770, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 700 is a small, handheld computing device, a desktop computer, or a computer server.

Although the exemplary embodiment described herein employs the hard disk 760, other types of computer-readable media which can store data that are accessible by a computer, such as magnetic cassettes, flash memory cards, digital versatile disks, cartridges, random access memories (RAMs) 750, and read-only memory (ROM) 740, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   receiving, at a processor in an automated kiosk, an electronic weather report for weather associated with a geographic location of the automated kiosk;
   receiving, from an exterior sensor mounted on the automated kiosk, exterior sensor data;
   receiving, from an interior sensor mounted inside the automated kiosk, interior sensor data;
   identifying, via the processor and based on at least one of the electronic weather report, the exterior sensor data, and the interior sensor data, a likelihood of a natural disaster affecting the automated kiosk;
   initiating, via the processor, movement of goods within the automated kiosk from a first location within the automated kiosk to a second location within the automated kiosk, the movement of goods being based on a type of the natural disaster and the likelihood of the natural disaster affecting the automated kiosks; and
   initiating, via the processor, an external protection action which modifies the automated kiosk based on the type of the natural disaster, the external protection action being based on the type of the natural disaster and the likelihood of the natural disaster affecting the automated kiosks.

2. The method of claim 1, wherein the type of the natural disaster is at least one of a fire, a flood, an earthquake, and high wind.

3. The method of claim 2, wherein when the type of the natural disaster comprises a flood, the movement of goods moves goods from a lower level inside the automated kiosk to a higher level inside the automated kiosk via an internal conveyor system.

4. The method of claim 2, wherein when the type of the natural disaster comprises a flood, the external protection action engages stilts which raise the automated kiosk.

5. The method of claim 2, wherein when the type of the natural disaster comprises a flood, the external protection action seals an interior of the automated kiosk from water entry.

6. The method of claim 2, wherein when the type of the natural disaster comprises a fire, the movement of goods moves goods from a heated side of the automated kiosk to a cooler side of the automated kiosk via an internal conveyor system.

7. The method of claim 2, wherein when the type of the natural disaster comprises a fire, the external protection action is at least one of deploying a flame retardant and deploying a heat shield.

8. The method of claim 2, wherein when the type of the natural disaster comprises high wind, the movement of goods moves goods from a higher level inside the automated kiosk to a lower level inside the automated kiosk via an internal conveyor system.

9. The method of claim 2, wherein when the type of the natural disaster comprises high wind, the external protection action opens air vents in the automated kiosk.

10. The method of claim 1, wherein the likelihood of the natural disaster affecting the automated kiosk is one of a plurality of levels, wherein each level of likelihood is associated with distinct movements of goods and distinct external protection actions.

11. An automated kiosk, comprising:
  at least one external sensor;
  at least one internal sensor;
  an internal conveyor system which moves goods between a plurality of storage locations and an exit location;
  a processor; and
  a computer-readable storage medium having instructions stored which, when executed by the processor, cause the processor to perform operations comprising:
    receiving an electronic weather report for weather associated with a geographic location of the automated kiosk;
    receiving exterior sensor data from the at least one exterior sensor;
    receiving interior sensor data from the at least one interior sensor;
    identifying, via the processor and based on at least one of the electronic weather report, the exterior sensor data, and the interior sensor data, a likelihood of a natural disaster affecting the automated kiosk; and
    initiating, via the processor, movement of goods within the automated kiosk from a first location within the automated kiosk to a second location within the automated kiosk, the movement of goods being based on a type of the natural disaster and the likelihood of the natural disaster affecting the automated kiosks.

12. The automated kiosk of claim 11, wherein the type of the natural disaster is at least one of a fire, a flood, an earthquake, and high wind.

13. The automated kiosk of claim 12, wherein when the type of the natural disaster comprises a flood, the movement of goods moves goods from a lower level inside the automated kiosk to a higher level inside the automated kiosk via an internal conveyor system.

14. The automated kiosk of claim 12, wherein when the type of the natural disaster comprises a fire, the movement of goods moves goods from a heated side of the automated kiosk to a cooler side of the automated kiosk via an internal conveyor system.

15. The automated kiosk of claim 12, wherein when the type of the natural disaster comprises high wind, the movement of goods moves goods from a higher level inside the automated kiosk to a lower level inside the automated kiosk via an internal conveyor system.

* * * * *